United States Patent
Kim et al.

(10) Patent No.: US 11,572,607 B2
(45) Date of Patent: Feb. 7, 2023

(54) ZINC ALLOY-PLATED STEEL HAVING EXCELLENT CORROSION RESISTANCE AND SURFACE SMOOTHNESS

(71) Applicant: POSCO, Pohang-si (KR)

(72) Inventors: Heung-Yun Kim, Gwangyang-si (KR); Myung-Soo Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 22 days.

(21) Appl. No.: 16/956,743

(22) PCT Filed: Dec. 20, 2018

(86) PCT No.: PCT/KR2018/016325
§ 371 (c)(1),
(2) Date: Jun. 22, 2020

(87) PCT Pub. No.: WO2019/132412
PCT Pub. Date: Jul. 4, 2019

(65) Prior Publication Data
US 2021/0010106 A1   Jan. 14, 2021

(30) Foreign Application Priority Data

Dec. 26, 2017   (KR) ........................ 10-2017-0180171
Dec. 19, 2018   (KR) ........................ 10-2018-0165575

(51) Int. Cl.
| | | |
|---|---|---|
| *C22C 18/04* | (2006.01) |
| *C23C 2/06* | (2006.01) |
| *C23C 2/14* | (2006.01) |
| *C23C 2/26* | (2006.01) |
| *C23C 2/18* | (2006.01) |
| *C23C 2/02* | (2006.01) |
| *C23C 30/00* | (2006.01) |
| *C23C 2/40* | (2006.01) |
| *C23C 2/28* | (2006.01) |
| *B32B 15/01* | (2006.01) |
| *C22C 18/00* | (2006.01) |
| *B32B 15/04* | (2006.01) |
| *B32B 15/18* | (2006.01) |

(52) U.S. Cl.
CPC .............. *C22C 18/04* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C22C 18/00* (2013.01); *C23C 2/02* (2013.01); *C23C 2/06* (2013.01); *C23C 2/14* (2013.01); *C23C 2/18* (2013.01); *C23C 2/26* (2013.01); *C23C 2/28* (2013.01); *C23C 2/40* (2013.01); *C23C 30/00* (2013.01); *C23C 30/005* (2013.01); *Y10T 428/12799* (2015.01); *Y10T 428/12958* (2015.01); *Y10T 428/12972* (2015.01); *Y10T 428/12979* (2015.01)

(58) Field of Classification Search
CPC ........... C22C 18/04; C22C 18/00; C23C 2/02; C23C 2/06; C23C 2/014; C23C 2/18; C23C 2/26; C23C 2/28; C23C 2/40; C23C 30/00; C23C 30/005; B32B 15/01; B32B 15/012; B32B 15/013; B32B 15/04; B32B 15/043; B32B 15/18; Y10T 428/12799; Y10T 428/12958; Y10T 428/12972; Y10T 428/12979
See application file for complete search history.

(56) References Cited

U.S. PATENT DOCUMENTS

| | | |
|---|---|---|
| 2005/0123786 A1 | 6/2005 | Honda et al. |
| 2009/0053555 A1 | 2/2009 | Nose et al. |
| 2014/0127531 A1 | 5/2014 | Yasui et al. |
| 2015/0072166 A1 | 3/2015 | Nakano et al. |
| 2015/0225831 A1 | 8/2015 | Riener et al. |
| 2018/0345339 A1 | 12/2018 | Jeon et al. |
| 2021/0381091 A1* | 12/2021 | Kim ........................ C23C 2/40 |

FOREIGN PATENT DOCUMENTS

| | | |
|---|---|---|
| CN | 105483594 | 4/2016 |
| EP | 0540005 | 5/1993 |
| JP | H10058004 | 3/1998 |
| JP | H10226865 | 8/1998 |
| JP | H11050224 | 2/1999 |
| JP | 2001020050 | 1/2001 |
| JP | 2001064759 | 3/2001 |
| JP | 2001355055 | 12/2001 |
| JP | 2002206156 | 7/2002 |
| JP | 2004068075 | 3/2004 |
| JP | 2006193776 | 7/2006 |
| JP | 2006283155 | 10/2006 |
| JP | 2010018876 | 1/2010 |
| JP | 2010100897 | 5/2010 |
| JP | 2010275634 | 12/2010 |

(Continued)

OTHER PUBLICATIONS

Machine Translation, Honda, JP 2006-283155, Oct. 2006. (Year: 2006).*
Machine Translation, Endo, JP 2002-206256 A, Jul. 2002. (Year: 2002).*
Machine Translation, Komatsu, JP 11-050224, Feb. 1999. (Year: 1999).*
Korean Decision of Rejection—Korean Application No. 10-2018-0165575 dated Nov. 13, 2020, citing JP 2006-283155, KR 10-2014-0083814, and JP 2015-036426.

(Continued)

*Primary Examiner* — Michael E. La Villa
(74) *Attorney, Agent, or Firm* — Cantor Colburn LLP

(57) ABSTRACT

Provided is a plated steel to be used for automobiles, electric home appliances, building materials and the like and, more specifically, to a zinc alloy-plated steel having excellent corrosion resistance and surface smoothness, and a method for manufacturing the same.

2 Claims, No Drawings

(56) References Cited

FOREIGN PATENT DOCUMENTS

| | | |
|---|---|---|
| JP | 2011157579 | 8/2011 |
| JP | 2015010242 | 1/2015 |
| JP | 2015036426 | 2/2015 |
| JP | 2017100189 | 6/2017 |
| KR | 100728893 | 6/2007 |
| KR | 20140083814 | 7/2014 |
| KR | 20140128464 | 11/2014 |
| KR | 20150073315 | 7/2015 |
| KR | 101560934 | 10/2015 |
| KR | 20160078918 | 7/2016 |
| KR | 20160079944 | 7/2016 |
| KR | 101677390 | 11/2016 |
| WO | 2013002358 | 1/2013 |
| WO | 2016162982 | 10/2016 |

OTHER PUBLICATIONS

Korean Office Action—Korean Application No. 10-2018-0165575 dated Sep. 1, 2020, citing JP 2006-283155, KR 10-2014-0083814, and JP 2015-036426.

European Search Report—European Application No. 18895346.7 dated Dec. 22, 2020, citing JP 2001-355055, JP 2001-020050, US 2009/0053555, JP 2015-036426, JP 2006-193776, and EP 0540005.

Japanese Office Action—Japanese Application No. 2020-535239 dated Aug. 3, 2021, citing JP 2010-100897, JP 2002-206156, WO 2013/002358, JP H11-050224, JP 2015-036426, JP 2010-275634, JP 2010-018876, JP 2006-193776, JP 2017-100189, JP 2015-010242, JP H10-058004, JP H10-226865, JP 2006-283155, US 2015/0225831, and KR 10-2015-0073315.

International Search Report—PCT/KR2018/016325 dated Mar. 27, 2019.

Honda et al., Plating Solidification Structure of Molten Zn-11% Al-3% Mg-0.2% Si Plated Steel Sheet, Journal of the Japanese Society of Metals, 2008, vol. 72, No. 1.

Third Party Observation—European Application No. 18895346.7 dated Dec. 1, 2022.

* cited by examiner

ZINC ALLOY-PLATED STEEL HAVING EXCELLENT CORROSION RESISTANCE AND SURFACE SMOOTHNESS

TECHNICAL FIELD

The present disclosure relates to a plated steel used in automobiles, electric home appliances, building materials, and the like, and more particularly, to a zinc alloy-plated steel having excellent corrosion resistance and surface smoothness, and a method for manufacturing the same.

BACKGROUND ART

Iron is a material used the most commonly in industry. Iron has excellent physical and mechanical properties, but is easily oxidized to be deteriorated in terms of physical and mechanical properties. For this reason, research has been conducted for many years to prevent the oxidation of iron. There are various methods for preventing the oxidation of iron. One of the methods is a method of retarding corrosion by coating a surface of a material with a metal, exhibiting higher reactivity with oxygen than iron as a protective layer, such that the protective layer is oxidized prior to iron to form a passivation layer. A method for manufacturing zinc-plated steel, on which a zinc layer or a zinc-plating layer is formed, has been used as a representative method.

Such zinc-plated steel, especially hot-dip galvanized steel, has been widely used in automobiles, electric home appliances, building materials, and the like, due to a simple manufacturing process and low manufacturing costs. When a portion of iron is exposed, zinc having higher oxidation dislocation than iron is dissolved first to protect the iron in a sacrificial manner and zinc-corrosion products are densely formed to suppress corrosion.

Recently, as a corrosive environment has worsened, many efforts have been made to improve corrosion resistance in terms of resource and energy saving. As a result of such recent efforts, corrosion resistance has been significantly improved by adding magnesium (Mg). As representative research, research into Zn—Al—Mg alloy-plated steel, in which Mg is added to a Zn—Al composition using zinc as a base material, is underway. For example, Patent Document 1, in which corrosion resistance is improved, and Patent Document 2, in which corrosion resistance of a processed part is improved, were proposed.

However, even the above-described alloy-plated steel suffers from a limitation in corrosion resistance in a poor environment such as an environment in constant contact with moisture, or a salt water environment. Therefore, further improved corrosion resistance is required.

As an exterior of plated steel, surface smoothness is significantly meaningful when the surface is exposed or an added value is increased by an exterior of the surface. Surface smoothness of plated steel is deteriorated due to various causes such as a defect occurring during a manufacturing process, a natural phenomenon occurring during a solidification process, and the like. The surface smoothness of the plated steel may have an effect on products in a subsequent process. For example, when the surface smoothness of the plated steel is poor, unevenness may be formed on a coated or laminated product.

According to Patent Document 3, poor surface smoothness, caused by a hairline crack generated by oxidation of Mg, is addressed by adjusting a composition of plating bath components and an oxygen concentration. However, the addition of another component or other equipment is required to result in increased costs and a complicated process. According to Patent Document 4, smoothness is improved by forming an Al-based intermetallic compound on a plated surface. However, various elements for forming the intermetallic compound are added to form dross. The intermetallic compound with the dross may act as unevenness to deteriorate surface smoothness.

(Patent Document 1) Japanese Patent Publication No. 1998-226865
(Patent Document 2) Korean Patent Publication No. 10-2016-0078918
(Patent Document 3) Korean Patent Registration No. 10-1560934
(Patent Document 4) Korean Patent Registration No. 10-0728893

DISCLOSURE

Technical Problem

An aspect of the present disclosure is to provide zinc alloy-plated steel having excellent surface smoothness while securing excellent corrosion resistance by optimizing a composition and a microstructure of a plating layer and a method for manufacturing the same.

On the other hand, the objective of the present disclosure is not limited to the description above. The objective of the present disclosure maybe understood from the content of the present specification. Those skilled in the art have no difficulty in understanding additional objectives of the present disclosure.

Technical Solution

According to an aspect of the present disclosure, zinc alloy-plated steel having excellent corrosion resistance and surface smoothness includes abase steel and a zinc alloy-plated layer formed on the base steel. The zinc alloy-plated layer includes, by weight percentage (wt %), 10 to 25% of aluminum (Al), 5 to 20% of magnesium (Mg), and a remainder of zinc (Zn) and unavoidable impurities. The zinc alloy-plated layer includes at least one of an Al solid-solution phase, a Zn solid-solution phase, an $MgZn_2$ alloy phase, an $Mg_2Zn_{11}$ alloy phase, and an Al—Mg—Zn eutectic phase. The zinc alloy-plated layer includes at least one of the $MgZn_2$ alloy phase and the $Mg_2Zn_{11}$ alloy phase in an area fraction of 20 to 50%. A total amount of the Al solid-solution phase and Al—Zn—Mg eutectic phase is 80% or less in an area fraction.

According to another aspect of the present disclosure, a method for manufacturing zinc alloy-plated steel having excellent corrosion resistance and surface smoothness includes preparing a base steel, adjusting the prepared base steel to have skewness (Rsk) of −0.2 to −1.2, plating the base steel by dipping the base steel in a plating bath including, by weight percentage (wt %), 10 to 25% of aluminum (Al), 5 to 20% of magnesium (Mg), and a remainder of zinc (Zn) and unavoidable impurities, and wiping and cooling the plated base steel.

Advantageous Effects

According to the present disclosure, a Zn-Al-Mg-based zinc alloy-plated steel having excellent corrosion resistance and surface smoothness and a method for manufacturing the same maybe provided. Due to the excellent corrosion resistance and surface smoothness, the zinc alloy-plated steel maybe applied to new fields to which existing plated steels are not applied.

BEST MODE FOR INVENTION

Hereinafter, the present disclosure will be described in detail.

Zinc alloy-plated steel according to the present disclosure includes base steel and a zinc alloy-plated layer formed on the base steel. A type of the base steel is not necessarily limited, and the base steel may any base steel applicable to technical fields to which the present disclosure pertains. For example, the base steel maybe a hot-rolled steel sheet, a cold-rolled steel sheet, a wire rod, a steel wire, or the like.

The zinc alloy-plated layer is based on zinc (Zn) and includes Mg and Al. The zinc alloy-plated layer may include, by weight percentage (wt %), 10 to 25% of aluminum (Al), 5 to 20% of magnesium (Mg), and a remainder of zinc (Zn) and unavoidable impurities. The zinc alloy-plated layer may further include at least one of strontium (Sr), beryllium (Be), calcium (Ca), and lithium (Li) in an amount of 0.0005 to 0.009%. Hereinafter, a chemical composition of the zinc alloy-plated steel will be described in detail. Hereinafter, the content of each element is in weight percentage (wt %).

Aluminum (Al): 10 to 25%

When a molten metal of a plating bath is produced, aluminum (Al) stabilizes a magnesium (Mg) component and serves as a corrosion barrier to suppress initial corrosion in a corrosive environment. The content of Al may vary depending on the content of Mg. When the content of Al is less than 10%, Mg may not be stabilized while producing the molten metal in the plating bath, and thus, Mg oxide may be formed on a surface of the molten metal to make it difficult to use Al. On the other hand, when the content of Al is greater 25%, a plating temperature maybe increased and various equipments mounted in the plating bath may be severely corroded. Therefore, the content of Al, greater than 25%, is not preferable.

Magnesium (Mg): 5 to 20%

Magnesium (Mg) is a main component forming a structure exhibiting corrosion resistance. When the content of Mg is less than 5%, exhibition of the corrosion resistance is insufficient. When the content of Mg is greater than 20%, a large amount of Mg oxide may be formed in the plating bath. Since various issues such as deterioration in a material and an increase in costs may secondarily occur, the content of Mg may be, in detail, 5 to 20%.

Other than Al and Mg, in detail, strontium (Sr), beryllium (Be), calcium (Ca), lithium (Li), and the like, may be additionally included to further stabilize the Mg component. Each of Sr, Be, Ca, Li, and the like, maybe included in an amount of, in detail, 0.0005 to 0.009%. When each of Sr, Be, Ca, Li, and the like, is included in an amount less than 0.0005%, it may be difficult to obtain a substantial Mg stabilization effect. When each of Sr, Be, Ca, Li, and the like, is included in an amount greater than 0.009%, solidification may occur at the end of plating to deteriorate corrosion resistance and to increase costs. Therefore, the above content is not preferable.

Other than the alloy composition, a remainder of zinc (Zn) and unavoidable impurities are included. The addition of effective elements, other than the alloy composition, is not excluded.

The zinc alloy-plated layer of the present disclosure may include an $MgZn_2$ alloy phase, an $Mg_2Zn_{11}$ alloy phase, an Al solid-solution phase, a Zn solid-solution phase, an Al—Zn—Mg eutectic phase, and the like. The solid solution phase refers to a phase in which another component is solid-solubilized, but also includes a single phase in which another component is not solid-solubilized.

The zinc alloy plating layer of the present invention is a primary crystal, in which an $MgZn_2$ alloy phase or an Al solid-solution phase may be formed. Then, the other phases such as an $MgZn_2$ alloy phase, $Mg_2Zn_{11}$ alloy phase, an Al solid-solution phase, a Zn solid-solution phase, an Al—Zn—Mg eutectic phase, and the like, may be formed. For example, when a primary crystal is an $MgZn_2$ alloy phase, an Al solid solution phase, an $Mg_2Zn_{11}$ alloy phase, a Zn solid-solution phase, and an Al—Zn—Mg eutectic phase are then formed. When the primary crystal is an Al solid-solution phase, an $MgZn_2$ alloy phase, an Al solid-solution phase, an $Mg_2Zn_{11}$ alloy phase, a Zn solid-solution phase, and Al—Zn—Mg solid-solution phase are then formed. The above phases maybe formed in a substantially non-equilibrium state.

The zinc alloy-plated layer may include the $MgZn_2$ alloy phase and the $Mg_2Zn_{11}$ alloy phase in an area fraction of, in detail, 20 to 50%. The zinc alloy-plated layer may include the Al solid-solution phase and Al—Zn—Mg eutectic phase in an area fraction of, in detail, 80% or less. A remainder may be, in detail, the Zn solid-solution phase.

The $MgZn_2$ alloy phase and the $Mg_2Zn_{11}$ alloy phase are phases exhibiting corrosion resistance. When a total amount thereof is less than 20%, it is insufficient to ensure excellent corrosion resistance even in the moisture environment and the salt water environment. When the total amount thereof is greater than 50%, corrosion resistance is increased, but possibility of cracking of a plating layer is increased because the $MgZn_2$ alloy phase and the $Mg_2Zn_{11}$ alloy phase are hard.

The Al solid-solution phase forms an initial corrosion barrier. The Al—Zn—Mg solid-solution phase, estimated to be formed at the end of solidification, exhibits corrosion resistance, but an effect thereof is not significant. Therefore, a total amount of the Al solid-solution phase and the Al—Zn—Mg eutectic phase may not be greater than, in detail, 80%. When the total amount of the Al solid-solution phase and the Al—Zn—Mg eutectic phase is greater than 80%, corrosion resistance may be deteriorated due to a decrease in the $MgZn_2$ alloy phase and the $Mg_2Zn_{11}$ alloy phase. The Al solid-solution phase and the Al—Zn—Mg eutectic phase may not be formed due to a composition or solidification in a non-equilibrium state.

Hereinafter, an example of manufacturing zinc alloy-plated steel according to the present disclosure will be described in detail.

The method of manufacturing zinc alloy-plated steel according to the present disclosure includes preparing a base steel, providing a shape advantageous for nucleation to a surface of the prepared base steel, dipping the prepared base steel in a plating bath, and performing wiping and cooling to manufacture zinc alloy-plated steel. Hereinafter, each of the processes will be described below.

Base steel is prepared, and a shape advantageous for nucleation is then provided to a surface of the prepared base steel.

To secure a plating layer of the above-described zinc alloy-plated steel and to secure a smooth surface, the shape advantageous for nucleation is provided to the surface of the base steel prior to plating. As a liquid alloy metal is cooled, solidification nuclei are generated. The solidification nuclei are formed at thermodynamically lowest Gibbs free energy.

The Gibbs free energy, caused by solidification, is advantageous in heterogeneous nucleation rather than homogenous nucleation and the larger an area of a heterogeneous nucleation site, the more advantageous nucleation, so that a large number of nuclei are created. Therefore, the heterogeneous nucleation site may be adjusted to control the nucleation number.

In this regard, it is necessary to provide a shape advantageous for nucleation to the surface of the base steel, which may be represented by skewness (Rsk). When the Rsk is less than 0, a valley of the surface is dominant. When the Rsk is greater than zero (0), a peak of the surface is dominant. To increase a nucleation number of the $MgZn_2$ alloy phase and the $Mg_2Zn_{11}$ alloy phase, the zinc alloy-plated steel according to the present disclosure is adjusted such that surface skewness Rsk of the base iron ranges from −0.2 to −1.2. The roughness skewness Rsk is a parameter among roughness parameters, and is a characteristic value indicating a direction and a degree of asymmetry of a profile for an average line. In addition, the roughness skewness Rsk may be confirmed using a roughness measuring device.

When the surface skewness Rsk is less than −0.2, nucleation of an alloy phase is less and nuclei are formed to have a large size, and thus, surface unevenness becomes severe. When the surface skewness Rsk is greater than −1.2, nucleation of an alloy phase is not additionally fine or increased. A shape, in which the surface skewness Rsk ranges from −0.2 to −1.2, has a structure in which a valley of roughness is deep and a peak of the roughness is flat.

There are various methods for obtaining the surface skewness Rsk, and the various methods may be classified into a direct forming method and an indirect forming method. The direct forming method is to fabricate the above-described shape directly on a surface of a material and is, for example, dissolution using an acid. The indirect forming method may be to typically fabricate the above-described shape by applying a pressure to steel using a skin pass rolling roll to which roughness is provided. Surface roughness of the skin pass rolling roll may be reduced by grinding a peak after providing surface roughness or planarizing a valley from the beginning.

The base steel is dipped in a plating bath to form a zinc alloy-plated layer on a surface of the base steel. A composition of the plating bath may include, by weight percentage (wt %), in detail, 10 to 25% of aluminum (Al), 5 to 20% of magnesium (Mg), and a remainder of zinc (Zn) and unavoidable impurities and may further include at least one of Sr, Be, Ca, and Li in an amount of 0.0005 to 0.009%. An alloy composition range of the plating bath is not different from the above-described alloy composition range of the zinc alloy-plated layer.

A temperature of the plating bath varies depending on a melting point, and the melting point is a physicochemical property depending on the composition of the plating bath. There are various factors, to determine the temperature of the plating bath, such as ease of operation, heating costs, plating quality, and the like. To take these into comprehensive consideration, the temperature of the plating bath is higher than the melting point and may be, in detail, 20 to 100° C. higher than the melting point.

The base steel dipped in the plating bath is set in consideration of ease of operation, heat balance, and the like. The plating bath temperature may range from, in detail, −10° C. to +10° C.

BEST MODE FOR INVENTION

Hereinafter, example embodiments of the present disclosure will be described. The disclosure may, however, be exemplified in many different forms and should not be construed as being limited to the specific embodiments set forth herein. Embodiments of the present disclosure are also provided to more fully describe the present disclosure to those skilled in the art.

EXAMPLE

A low-carbon steel sheet (including C: 0.0014 wt %, Mn: 0.15 wt %, P: 0.05 wt %, S: 0.005 wt %, Si: 0.05 wt %, and a remainder of iron (Fe) and unavoidable impurities) having a thickness of 0.8 mm, a width 120 mm, and a length 200 mm was prepared as a test specimen, and skewness Rsk of a surface of the steel sheet was adjusted as shown in Table 1. The skewness Rsk was adjusted in such a manner that surface roughness of the steel sheet was provided. Specifically, the surface roughness was provided to rolls and the steel sheet passed between the rolls to transfer the surface roughness to the steel sheet. The skewness Rsk was adjusted by changing shapes of a valley and a peak when the surface roughness was provided to the rolls.

The prepared test specimen was dipped in a plating bath to manufacture zinc alloy-plated steel having a plating layer composition of Table 1. In this case, since a temperature of the plating bath varied depending on a melting point of the plating composition, the temperature of the plating bath was set to be within a range of 480 to 570° C., and a dipping temperature of the steel sheet was 10° C. higher than the temperature of the plating bath. After the dipping, the surface of the zinc alloy-plated steel, pulled up from the plating bath, was subjected to gas wiping to adjust a coating weight to a one-side coating weight of 70 $g/m^3$, and then cooled to room temperature at an average cooling rate of 10° C./sec to manufacture zinc alloy-plated steel.

Phases of specimens of the manufactured zinc alloy-plated steel were identified through energy dispersive x-ray spectroscopy (EDS) analysis, and phase fractions thereof were measured through X-ray diffraction (XRD) analysis, and results thereof are listed in Table 1.

In the specimens, corrosion resistance, surface cracking, and solidification-contraction depth were measured, and results thereof are listed in Table 2.

The corrosion resistance was expressed as a corrosion resistance index by dividing red-rusting time by a coating amount in a salt spray test and non-dimensionalizing a result of the division. The salt spray test were performed under conditions of a salinity of 5%, a temperature of 35° C., a pH of 6.8, and a salt spray amount of 2 ml/80 $cm^2 \cdot 1$ Hr.

In the surface cracking, after 180-degree bending, a plating layer was observed by an SEM to check whether cracking occurred. The solidification-contraction depth was obtained to confirm surface smoothness, and a depth depending on solidification and contraction was three-dimensionally measured and then evaluated based on the following criteria.

◯: solidification-contraction depth less than 0 to 2 μm,

Δ: solidification-contraction depth less than 2 to 4 μm,

X: solidification-contraction depth 4 μm or more

TABLE 1

| Classification | Base Steel Skewness (Rsk) | Composition of Plating Layer (wt %) | | | Phase Fraction of Plating Layer (area %) | | | | |
|---|---|---|---|---|---|---|---|---|---|
| | | Al | Mg | Total Amount of Sr, Be, Ca, and Li | $MgZn_2$ | $Mg_2Zn_{11}$ | Al Solid-Solution Phase | Al—Zn—Mg Eutectic Phase | Zn Solid-Solution Phase |
| CE1 | 0.16 | 14 | 7 | | 12 | 4 | 16 | 35 | 33 |
| CE2 | 0.28 | 1.5 | 1.5 | | 5 | 2 | 3 | 78 | 12 |
| IE1 | −0.01 | 14 | 7 | | 14 | 6 | 18 | 28 | 34 |
| IE2 | −0.85 | 10 | 5 | | 19 | 15 | 12 | 7 | 47 |
| IE3 | −0.85 | 14 | 7 | | 22 | 13 | 18 | 8 | 39 |
| IE4 | −0.85 | 14 | 7 | 0.0005 | 23 | 14 | 15 | 6 | 42 |
| IE5 | −0.85 | 14 | 7 | 0.0090 | 21 | 15 | 16 | 8 | 40 |
| CE3 | −0.85 | 14 | 7 | 0.0200 | 22 | 12 | 16 | 8 | 42 |
| IE6 | −0.85 | 15 | 10 | | 26 | 17 | 20 | 6 | 31 |
| IE7 | −0.85 | 25 | 6 | | 20 | 13 | 25 | 4 | 38 |
| IE8 | −0.85 | 25 | 20 | | 37 | 12 | 15 | 4 | 32 |
| CE4 | −0.38 | 30 | 22 | | 48 | 14 | 19 | 8 | 11 |
| IE9 | −1.20 | 14 | 7 | | 22 | 16 | 18 | 5 | 39 |
| CE5 | −1.50 | 14 | 7 | | 11 | 8 | 18 | 28 | 35 |

IE: Inventive Example/CE: Comparative Example

TABLE 2

| Classification | $MgZn_2$ + $Mg_2Zn_{11}$ | Corrosion Resistance Index | Surface Cracking | Solidification-Contraction Depth |
|---|---|---|---|---|
| CE1 | 16 | 32 | Not Occurred | X |
| CE2 | 7 | 19 | Not Occurred | X |
| IE1 | 20 | 40 | Not Occurred | ○ |
| IE2 | 34 | 55 | Not Occurred | ○ |
| IE3 | 35 | 48 | Not Occurred | ○ |
| IE4 | 37 | 49 | Not Occurred | ○ |
| IE5 | 36 | 48 | Not Occurred | ○ |
| CE3 | 33 | 28 | Not Occurred | Δ |
| IE6 | 43 | 44 | Not Occurred | ○ |
| IE7 | 33 | 46 | Not Occurred | ○ |
| IE8 | 49 | 54 | Not Occurred | ○ |
| CE4 | 62 | 52 | Occurred | X |
| IE9 | 38 | 50 | Not Occurred | ○ |
| CE5 | 19 | 34 | Not Occurred | X |

IE: Inventive Example/CE: Comparative Example

As can be seen from a result of Table 2, Inventive Examples, satisfying conditions of the present disclosure, have excellent corrosion resistance, no surface cracking, and excellent surface smoothness.

However, Comparative Examples 1, 2, and 5 satisfy a composition of a plating layer of the present disclosure, but do not satisfy surface skewness of a base steel sheet. Since Comparative Examples 1, 2, and 5 do not secure a plating layer structure required by the present disclosure, corrosion resistance and surface smoothness thereof are poor. Comparative Examples 3 and 4 satisfy conditions of a base steel plate, but are out of plating compositions. In Comparative Examples 3 and 4, corrosion resistance is poor and surface cracking may occur or surface smoothness is poor.

The invention claimed is:

1. A zinc alloy-plated steel having excellent corrosion resistance and surface smoothness, the zinc alloy-plated steel comprising:
    a base steel and a zinc alloy-plated layer formed on the base steel,
    wherein the zinc alloy-plated layer comprises, by weight percentage (wt %), 10 to 25% of aluminum (Al), 5 to 20% of magnesium (Mg), and a remainder of zinc (Zn) and unavoidable impurities,
    the zinc alloy-plated layer comprises: at least one of an $MgZn_2$ alloy phase and an $Mg_2Zn_{11}$ alloy phase; an Al solid-solution phase; an Al-Zn-Mg eutectic phase; and a remainder of a Zn solid solution phase,
    a total area fraction of the at least one of the $MgZn_2$ alloy phase and the $Mg_2Zn_{11}$ alloy phase is 20 to 50%,
    a total area fraction of the Al solid-solution phase and Al-Zn-Mg eutectic phase is 46% or less, and
    an area fraction of the Al solid-solution phase is 12 to 25%.

2. The zinc alloy-plated steel of claim 1, wherein the zinc alloy-plated layer further comprises, by weight percentage (wt %), at least one of strontium (Sr), beryllium (Be), calcium (Ca), and lithium (Li) in a total amount of 0.0005 to 0.009%.

\* \* \* \* \*